US009322436B2

(12) United States Patent
Tokunaga et al.

(10) Patent No.: US 9,322,436 B2
(45) Date of Patent: Apr. 26, 2016

(54) SLIDING PARTS

(71) Applicant: EAGLE INDUSTRY CO., LTD., Tokyo (JP)

(72) Inventors: Yuichiro Tokunaga, Tokyo (JP); Masatoshi Itadani, Tokyo (JP); Kazumasa Sunagawa, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 14/439,192

(22) PCT Filed: Mar. 11, 2014

(86) PCT No.: PCT/JP2014/056321
§ 371 (c)(1),
(2) Date: Apr. 28, 2015

(87) PCT Pub. No.: WO2014/148316
PCT Pub. Date: Sep. 25, 2014

(65) Prior Publication Data
US 2015/0377297 A1 Dec. 31, 2015

(30) Foreign Application Priority Data
Mar. 17, 2013 (JP) .................................. 2013-054459

(51) Int. Cl.
F16C 17/04 (2006.01)
F16J 15/34 (2006.01)
F16C 33/74 (2006.01)
F16C 17/02 (2006.01)

(52) U.S. Cl.
CPC ............. *F16C 33/748* (2013.01); *F16C 17/026* (2013.01); *F16J 15/3412* (2013.01)

(58) Field of Classification Search
CPC .................................. F16C 17/045; F16J 15/34
See application file for complete search history.

(56) References Cited

U.S. PATENT DOCUMENTS

| 5,201,531 A | 4/1993 | Lai .............................. 277/96.1 |
| 5,498,007 A | 3/1996 | Kulkarni et al. ............. 277/96.1 |
| 5,501,470 A | 3/1996 | Fuse et al. ..................... 277/96.1 |
| 6,655,693 B2 * | 12/2003 | Hosanna ............. F16J 15/3404 277/358 |

(Continued)

FOREIGN PATENT DOCUMENTS

| DE | 1221865 | 7/1966 | |
| JP | H01133572 | 9/1989 | ............... F16J 15/34 |

(Continued)

OTHER PUBLICATIONS

International Preliminary Report on Patentability issued in corresponding PCT Patent Appln. No. PCT/JP2014/056321 dated Sep. 22, 2015 (6 pgs).

(Continued)

*Primary Examiner* — Thomas R. Hannon
(74) *Attorney, Agent, or Firm* — Hayes Soloway P.C.

(57) ABSTRACT

A positive pressure generation mechanism includes a positive pressure generation groove provided on a high pressure side of one of sealing faces of a pair of sliding parts including annular bodies that relatively slide on each other, a negative pressure generation mechanism including a negative pressure generation groove provided on a low pressure side, a pressure release groove provided between the positive pressure generation groove and the negative pressure generation groove, and a radial groove that provides communication between the positive pressure generation groove.

9 Claims, 5 Drawing Sheets

(56) References Cited

U.S. PATENT DOCUMENTS

| | | | |
|---|---|---|---|
| 9,151,389 B2* | 10/2015 | Itadani | F16J 15/3412 |
| 2013/0087979 A1* | 4/2013 | Wen | D04C 1/12 |
| | | | 277/500 |
| 2013/0209011 A1 | 8/2013 | Tokunaga | 384/123 |
| 2014/0217676 A1* | 8/2014 | Hosoe | F16J 15/3412 |
| | | | 277/350 |
| 2015/0115537 A1* | 4/2015 | Tokunaga | F16J 15/348 |
| | | | 277/348 |

FOREIGN PATENT DOCUMENTS

| | | | |
|---|---|---|---|
| JP | H0666374 | 3/1994 | F16J 15/34 |
| JP | H0735242 | 2/1995 | F17J 15/34 |
| WO | WO2012046749 | 4/2012 | F16C 33/10 |

OTHER PUBLICATIONS

International Search Report issued in related application No. PCT/JP/2014/056321, dated Jun. 9, 2014 (4 pgs).

* cited by examiner

SLIDING PARTS

TECHNICAL FIELD

The present invention relates to sliding parts suitable for a mechanical seal, a bearing, and other sliding portions for example. In particular, the present invention relates to sliding parts such as a sealing ring or a bearing in which a fluid lies on sealing faces to reduce friction and there is a need for preventing fluid leakage from the sealing faces.

BACKGROUND ART

In a mechanical seal serving as one example of the sliding parts, performances thereof are evaluated by a leakage amount, a wear amount, and torque. In the prior art, the performances are enhanced by optimizing sliding material and sealing face roughness of the mechanical seal, so as to realize low leakage, long life, and low torque. However, due to raising awareness of environmental problems in recent years, further improvement in the performances of the mechanical seal is required, and there is a need for technical development going beyond the boundary of the prior art.

Under such circumstances, the present applicant filed an application for a patent on the invention of sliding parts in which no leakage is caused in a static state, the sliding parts that are actuated with fluid lubrication in a rotating state including an initial stage of rotation while leakage is prevented, so that sealing and lubrication can be realized at the same time (hereinafter, referred to as the "prior art", see Patent Document 1).

As one embodiment of this prior art, as shown in FIG. 5, sliding parts in which an outer peripheral side of a sliding part 31 including annular bodies serves as a high pressure fluid side and an inner peripheral side serves as a low pressure fluid side, a groove section 35 of a Rayleigh step mechanism 33 that forms a positive pressure generation mechanism is provided on a high pressure side of a sealing face 32, a groove section 36 of a reversed Rayleigh step mechanism 34 that forms a negative pressure generation mechanism is provided on a low pressure side, a pressure release groove 45 is provided between the groove section 35 and the groove section 36, and the groove section 35, the pressure release groove 45, and the groove section 36 communicate with the high pressure fluid side via a radial groove 37 and are isolated from the low pressure fluid side by a seal face 38, wherein the radial groove 37 is inclined toward the rotating direction of the opposing sealing face from the inner peripheral side where the radial groove communicates with the groove section 36 toward the outer peripheral side are proposed. In a case of this embodiment, a fluid on the sealing face 32 is discharged in the direction shown by an arrow 46. The groove depth of the groove section 35 and the groove section 36 is about a few nm, the groove depth of the radial groove 37 and the pressure release groove 45 is about ten μm, and the groove depth of the radial groove 37 and the pressure release groove 45 is sufficiently greater than the groove depth of the groove section 35 and the groove section 36.

CITATION LIST

Patent Document

Patent Document 1: WO 2012/046749

SUMMARY OF INVENTION

Technical Problem

The above prior art is extremely excellent in a point that no leakage is caused in a static state, the sliding parts are actuated with fluid lubrication in a rotating state including an initial stage of rotation while leakage is prevented, so that sealing and lubrication can be realized at the same time. However, discharge of foreign substances and bubbles taken into the sealing face is not considered. Thus, the outer peripheral side of the radial groove 37 is orthogonal to a tangent line of an outer peripheral portion, and the inner peripheral side that communicates with the groove section 36 is set to be inclined only toward the rotating direction of the opposing sealing face. Therefore, the fluid is not easily taken in from the radial groove. The present inventor confirmed that for example, in a case where foreign substances and bubbles are taken into the sealing faces, wear, burnout, and the like are generated due to leakage of the sealing faces and friction heat generation, and hence there is a fear that functions of the mechanical seal are lowered.

The present invention is achieved in order to improve disadvantages of the prior art while utilizing advantages thereof. A first objective of the present invention is to provide sliding parts by which while meeting contradictory conditions of sealing and lubrication, a fluid is actively taken into sealing faces, and even in a case where foreign substances and bubbles are taken into the sealing faces, wear, burnout, and the like due to leakage of the sealing faces and friction heat generation are prevented, so that a sealing function of the sealing faces can be maintained for a long time.

A second objective of the present invention is to provide sliding parts in which the sealable pressure limit is increased, so that a seal pressure resistance performance can be improved.

Solution to Problem

In order to achieve the foregoing objectives, a first aspect of the present invention is a pair of sliding parts including annular bodies, in which a positive pressure generation mechanism including a positive pressure generation groove is provided on a high pressure side of one of sealing faces that relatively slide on each other, a negative pressure generation mechanism including a negative pressure generation groove is provided on a low pressure side, a pressure release groove is provided between the positive pressure generation groove and the negative pressure generation groove, and further, a radial groove that provides communication between the positive pressure generation groove, the pressure release groove and the negative pressure generation groove, and a high pressure fluid side is provided on the sealing face, and the positive pressure generation groove, the pressure release groove, the negative pressure generation groove, and the radial groove are isolated from a low pressure fluid side by a seal face, wherein the radial groove includes an inlet section that provides communication between an upstream side of the positive pressure generation groove and the pressure release groove, and the high pressure fluid side, and an outlet section that provides communication between a downstream side of the negative pressure generation groove and the pressure release groove, and the high pressure fluid side, the inlet section and the outlet section are inclined in the directions in which the sections respectively open from the low pressure side toward the high pressure side, and an intersection angle of both the sections made by a tangent line on a sealing face end is set to be an obtuse angle.

According to this aspect, the inlet section and the outlet section of the radial groove are inclined in the directions in which the sections respectively open from the low pressure side toward the high pressure side and the intersection angle of both the sections made by the tangent line on the sealing face end is set to be an obtuse angle. Thereby, a fluid is easily taken into the inlet section from the high pressure fluid side, and the fluid on the sealing faces is easily discharged from the outlet section. Therefore, a flow of the fluid is generated in a passage formed by the inlet section, the pressure release groove, and the outlet section, foreign substances and bubbles are prevented from remaining inside the passage, and wear, burnout, and the like due to leakage of the sealing faces and friction heat generation are prevented. Thereby, a sealing function of the sealing faces can be maintained for a long time.

An inner peripheral side part of the outlet section of the radial groove that communicates with the negative pressure generation groove is formed by extending the inclined outlet section directly to the inner peripheral side. Thus, in the inner peripheral side part that communicates with the negative pressure generation groove, the flow of the fluid is also generated, so that foreign substances and bubbles are prevented from remaining in the inner peripheral side part.

A second aspect of the present invention is the sliding parts according to the first aspect, wherein the outlet section is formed in a spiral shape from the low pressure side to the high pressure side.

According to this aspect, the pressure on the low pressure side can be lowered. As a result, the sealable limit pressure can be increased more than the sliding parts according to the prior art, so that a seal pressure resistance performance can be improved.

A third aspect of the present invention is the sliding parts according to the first or second aspect, wherein a part of the outlet section that communicates with the negative pressure generation groove is formed to be equal to or deeper than the positive pressure generation groove or the negative pressure generation groove and shallower than the other parts of the radial groove.

According to this aspect, the part of the outlet section of the radial groove that communicates with the negative pressure generation groove functions as the negative pressure generation mechanism, so that the inside pressure of the part that communicates with the negative pressure generation groove can be maintained to be low. As a result, together with the above second aspect, the sealable limit pressure can be furthermore increased more than the sliding parts according to the prior art, so that the seal pressure resistance performance can be improved.

A fourth aspect of the present invention is the sliding parts according to any of the first to third aspects, wherein the positive pressure generation mechanism on the high pressure side is formed from a Rayleigh step mechanism, the negative pressure generation mechanism on the low pressure side is formed from a reversed Rayleigh step mechanism, the pressure release groove is formed from a circumferential groove, plural pairs of the Rayleigh step mechanisms and the reversed Rayleigh step mechanisms are provided in such a manner that each of the pairs is set in parallel in the circumferential direction across the pressure release groove, the Rayleigh step is also provided between the outlet section on the upstream side and the adjacent inlet section on the downstream side, and the reversed Rayleigh step mechanism is extended over the adjacent outlet sections.

According to this aspect, positive pressure is generated substantially continuously on the high pressure side in the circumferential direction of the sealing faces, and negative pressure is generated substantially continuously on the low pressure side. Thus, lubrication and leakage prevention can be further realized at the same time.

Advantageous Effects of Invention

The present invention exhibits the following superior effects.

(1) The inlet section and the outlet section of the radial groove are inclined in the directions in which the sections respectively open from the low pressure side toward the high pressure side and the intersection angle of both the sections made by the tangent line on the sealing face end is set to be an obtuse angle. Thereby, the fluid is easily taken into the inlet section from the high pressure fluid side, and the fluid on the sealing faces is easily discharged from the outlet section. Therefore, the flow of the fluid is generated in the passage formed by the inlet section, the pressure release groove, and the outlet section, foreign substances and bubbles are prevented from remaining inside the passage, and wear, burnout, and the like due to leakage of the sealing faces and friction heat generation are prevented. Thereby, the sealing function of the sealing faces can be maintained for a long time.

The inner peripheral side part of the outlet section of the radial groove that communicates with the negative pressure generation groove is formed by extending the inclined outlet section directly to the inner peripheral side. Thus, in the inner peripheral side part that communicates with the negative pressure generation groove, the flow of the fluid is also generated, so that foreign substances and bubbles are prevented from remaining in the inner peripheral side part.

(2) The outlet section of the radial groove is formed in a spiral shape from the low pressure side to the high pressure side. Thereby, the pressure on the low pressure side can be lowered. As a result, the sealable limit pressure can be increased more than the sliding parts according to the prior art, so that the seal pressure resistance performance can be improved.

(3) The part of the outlet section of the radial groove that communicates with the negative pressure generation groove is formed to be equal to or deeper than the positive pressure generation groove or the negative pressure generation groove and shallower than the other parts of the radial groove. Thereby, the part of the outlet section of the radial groove that communicates with the negative pressure generation groove functions as the negative pressure generation mechanism, so that the inside pressure of the part that communicates with the negative pressure generation groove can be maintained to be low. As a result, together with the above second aspect, the sealable limit pressure can be furthermore increased more than the sliding parts according to the prior art, so that the seal pressure resistance performance can be improved.

(4) The positive pressure generation mechanism on the high pressure side is formed from the Rayleigh step mechanism, the negative pressure generation mechanism on the low pressure side is formed from the reversed Rayleigh step mechanism, the pressure release groove is formed from the circumferential groove, plural pairs of the Rayleigh step mechanisms and the reversed Rayleigh step mechanisms are provided in such a manner that each of the pairs is set in parallel in the circumferential direction across the pressure release groove, the Rayleigh step is also provided between the outlet section on the upstream side and the adjacent inlet section on the downstream side, and the reversed Rayleigh step mechanism is extended over the adjacent outlet sections. Thereby, positive pressure is generated substantially continuously on the high pressure side in the circumferential direction of the sealing faces, and negative pressure is generated substantially continuously on the low pressure side. Thus, lubrication and leakage prevention can be further realized at the same time.

BRIEF DESCRIPTION OF DRAWINGS

FIG. 2(a) is a plan view of the sealing face; and FIG. 2(b) is a perspective view of part of the sealing face;

FIG. 3 is a view for illustrating a positive pressure generation mechanism formed by a Rayleigh step mechanism or the like, and a negative pressure generation mechanism formed by a reversed Rayleigh step mechanism or the like: FIG. 3(a) shows the Rayleigh step mechanism; and FIG. 3(b) shows the reversed Rayleigh step mechanism;

FIG. 4(a) is a plan view of the sealing face; and FIG. 4(b) is a perspective view of part of the sealing face.

DESCRIPTION OF EMBODIMENTS

Hereinafter, with reference to the drawings, modes for carrying out the present invention will be described with examples based on embodiments. However, regarding size, material, shape, and relative arrangement of constituent parts described in the embodiments, and the like, there is no intention to limit the scope of the present invention only to those unless specifically and clearly described.

First Embodiment

Figure 1:
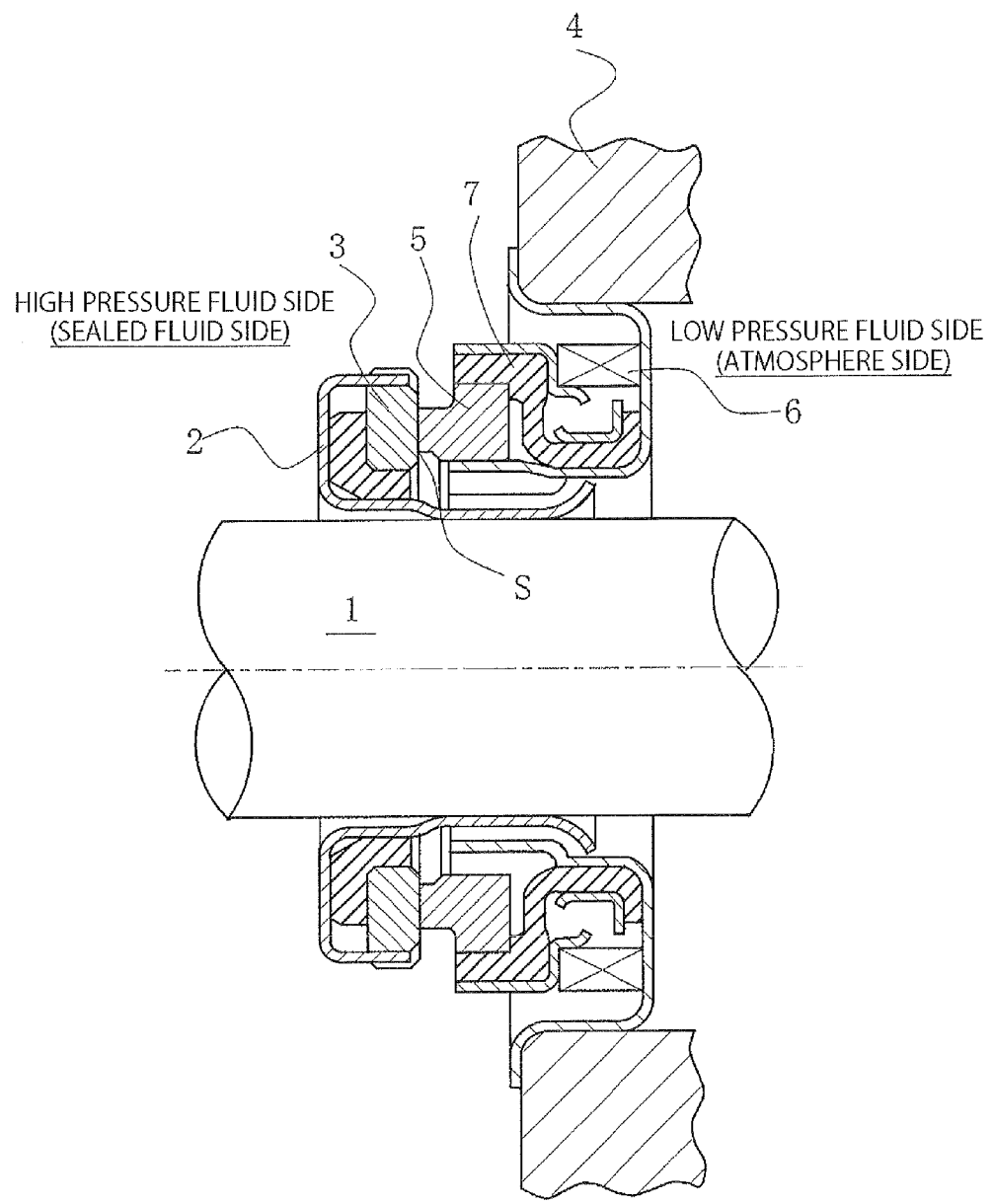
FIG. 1 is a vertically sectional view showing one example of a mechanical seal according to a first embodiment of the present invention.
Figure 2:
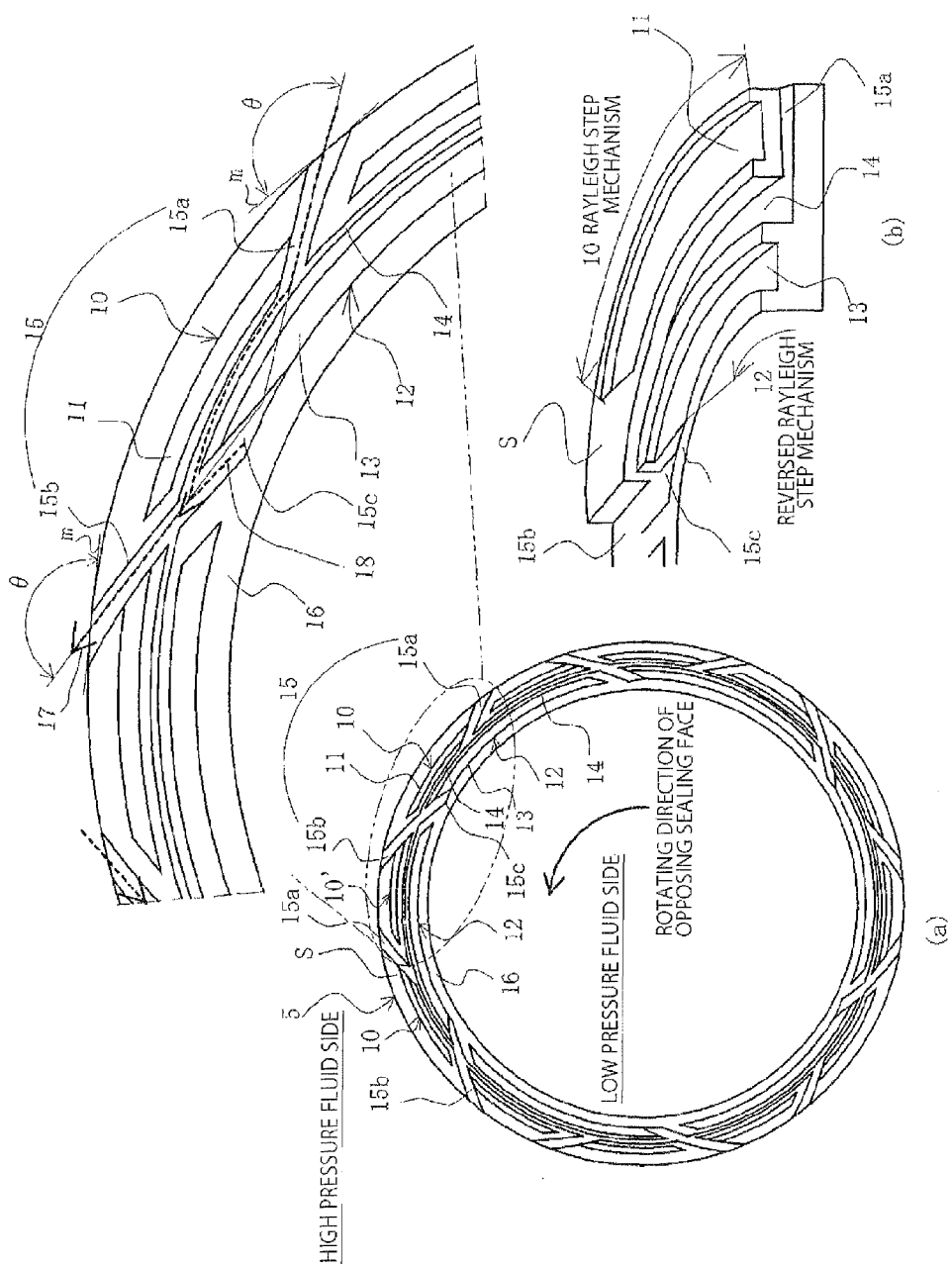
FIG. 2 shows a sealing face of a sliding part according to the first embodiment of the present invention.
Figure 3:
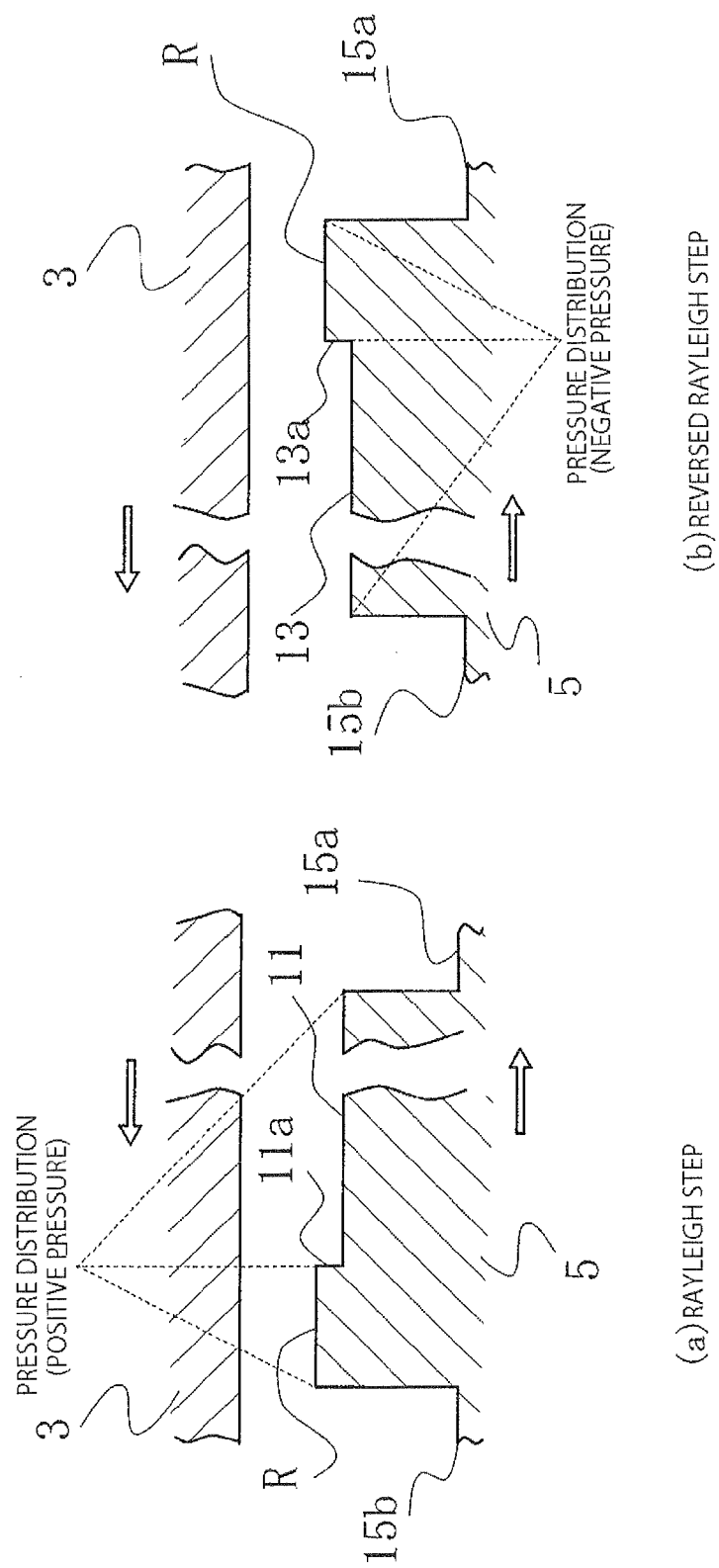

With reference to FIGS. 1 to 3, sliding parts according to a first embodiment of the present invention will be described.

It should be noted that in the following embodiment, a mechanical seal serving as one example of the sliding parts will be described as an example. In the description, an outer peripheral side of the sliding parts that form the mechanical seal serves as a high pressure fluid side (sealed fluid side), and an inner peripheral side serves as a low pressure fluid side (atmosphere side). However, the present invention is not limited to this but can also be applied to a case where the high pressure fluid side and the low pressure fluid side are set the other way around.

FIG. 1 is a vertically sectional view showing one example of the mechanical seal that is an inside mechanical seal for sealing a sealed fluid on the high pressure fluid side to be leaked out from an outer periphery of a sealing face toward an inner periphery. In the mechanical seal, on the side of a rotating shaft 1 that drives a pump impeller (not shown) on the high pressure fluid side, an annular rotating ring 3 serving as one of the sliding parts is provided via a sleeve 2 in a state that the rotating ring can be rotated integrally with this rotating shaft 1, an annular stationary ring 5 serving as the other sliding part is provided in a housing 4 of a pump in a state that the stationary ring is not rotated but can be moved in the axial direction, and sealing faces S mirror-finished by lapping or the like closely slide on each other by means of a coiled wave spring 6 and bellows 7 that bias the stationary ring 5 in the axial direction. That is, this mechanical seal is to prevent the sealed fluid from flowing out from an outer periphery of the rotating shaft 1 to the atmosphere side on the sealing faces S of the rotating ring 3 and the stationary ring 5.

FIG. 2 shows the sealing face of the sliding part according to the first embodiment of the present invention. A case where the present invention is applied to the sealing face of the stationary ring 5 of FIG. 2 will be described as an example.

It should be noted that a case where the present invention is applied to the sealing face of the rotating ring 3 is basically similar. However, in that case, a radial groove is only required to communicate with the high pressure fluid side (sealed fluid side) and hence not required to be provided up to the outer peripheral side of the sealing face.

In FIG. 2, the outer peripheral side of the sealing face of the stationary ring 5 serves as the high pressure fluid side, the inner peripheral side serves as the low pressure fluid side such as the atmosphere side, and the opposing sealing face is rotated anti-clockwise in the description.

A positive pressure generation mechanism 10 including a positive pressure generation groove 11 is provided on the high pressure side of the sealing face S of the stationary ring 5, and a negative pressure generation mechanism 12 including a negative pressure generation groove 13 is provided on the low pressure side. Between the positive pressure generation groove 11 and the negative pressure generation groove 13, a pressure release groove 14 is provided, and further, a radial groove 15 that provides communication between the positive pressure generation groove 11, the pressure release groove 14 and the negative pressure generation groove 13, and the high pressure fluid side is provided. The positive pressure generation groove 11, the pressure release groove 14, the negative pressure generation groove 13, and the radial groove 15 are isolated from the low pressure fluid side by a low pressure side seal face 16.

In the example of FIG. 2, the positive pressure generation mechanism 10 on the outer peripheral side is formed from a Rayleigh step mechanism, the negative pressure generation mechanism 12 on the low pressure side is formed from a reversed Rayleigh step mechanism, the pressure release groove 14 is formed from a circumferential groove, and plural pairs of the Rayleigh step mechanisms and the reversed Rayleigh step mechanisms are provided in such a manner that each of the pairs is set in parallel in the circumferential direction across the pressure release groove 14.

It should be noted that the Rayleigh step mechanism and the reversed Rayleigh step mechanism will be described in detail later.

The radial groove 15 includes an inlet section 15a that provides communication between an upstream side of the positive pressure generation groove 11 and the pressure release groove 14, and the high pressure fluid side, and an outlet section 15b that provides communication between a downstream side of the negative pressure generation groove 13 and the pressure release groove 14, and the high pressure fluid side. The inlet section 15a and the outlet section 15b are inclined in the directions in which the sections respectively open from the low pressure side toward the high pressure side, and an intersection angle θ of both the sections made by a tangent line m on a sealing face end is set to be an obtuse angle. This intersection angle θ of the inlet section 15a and the outlet section 15b made by the tangent line m is set to be an optimal value in such a manner that the fluid is easily brought into the inlet section 15a and easily discharged from the outlet section 15b in consideration with the diameter of the sliding parts, the sealing face width, the number of the inlet section 15a and the outlet section 15b, the type of the sealed fluid, the pressure, the temperature, and the like. In a case of FIG. 2, the inlet section 15a and the outlet section 15b open symmetrically, and the intersection angle θ of the sections made by the tangent line m is about 140°. The inlet section 15a and the outlet section 15b may open asymmetrically. The open angle θ is preferably set within the range of θ=150°±30°.

The inlet section 15a and the outlet section 15b are not limited to a straight shape but may be formed in a curved shape such as an arc shape. In addition, in a case of the straight shape, portions to be respectively connected to the pressure release groove 14 may be formed in a smooth arc shape.

The positive pressure generation mechanism 10 suctions the fluid from the high pressure fluid side via the inlet section 15a of the radial groove 15 on an upstream side thereof, generates positive pressure, extends a clearance between the sealing faces that relatively slide on each other by the generated positive pressure, and forms a liquid film on the sealing faces, so as to improve a lubricating property.

The pressure release groove 14 is to prevent that by releasing dynamic pressure (positive pressure) generated in the positive pressure generation mechanism 10 on the high pressure side such as the Rayleigh step mechanism to pressure of a high pressure side fluid, the fluid flows into the negative pressure generation mechanism 12 on the low pressure side such as the reversed Rayleigh step mechanism and a negative pressure generation ability of the negative pressure generation mechanism 12 is weakened. The fluid to flow into the low pressure side by the pressure generated in the positive pressure generation mechanism 10 on the high pressure side is guided to the pressure release groove 14, so that the pressure release groove plays a role of letting the fluid go to the high pressure fluid side via the radial groove 15.

Further, in the negative pressure generation mechanism 12, as a result of generation of negative pressure, cavitation is generated. Since the cavitation inside pressure is negative pressure that is lower than the atmospheric pressure, pressure gradient is negative in a low pressure side end, and suctioning (pumping) is generated on the inner peripheral side of the sealing face. The pressure inside the negative pressure generation mechanism 12 becomes lower than low pressure side fluid pressure (atmospheric pressure). As a result, the fluid flows into the negative pressure generation mechanism 12 from the low pressure fluid side via the low pressure side seal face 16. Consequently, suctioning is generated on the inner peripheral side of the sealing face, so that leakage from the high pressure fluid side to the low pressure fluid side is prevented. The fluid suctioned into the negative pressure generation mechanism 12 is discharged to the high pressure fluid side via the outlet section 15b of the radial groove 15 connected to the high pressure fluid side on the downstream side thereof.

The depth and the width of the positive pressure generation groove 11, the negative pressure generation groove 13, the pressure release groove 14, and the radial groove 15 are appropriately determined in accordance with the diameter of the sliding parts, the sealing face width and the relative moving speed, sealing and lubrication conditions, and the like.

One example will be shown. In a case where the diameter of the sliding parts is about 20 mm and the sealing face width is about 2 mm, the width of the positive pressure generation groove 11 and the negative pressure generation groove 13 is 0.4 to 0.6 mm, the depth of the grooves is a few μm, and the width of the seal face 16 on the inner peripheral side is 0.2 to 0.4 mm. The width of the pressure release groove 14 and the radial groove 15 is the width sufficient for letting the high pressure fluid go to the high pressure fluid side, and the depth of the grooves is tens of μm to hundreds of μm.

As described above, the inlet section 15a and the outlet section 15b of the radial groove 15 are inclined in the directions in which the sections respectively open from the low pressure side toward the high pressure side, and the intersection angle θ of both the sections made by the tangent line m on the sealing face end is set to be an obtuse angle. Thereby, the fluid is easily taken into the inlet section 15a from the high pressure fluid side and the fluid on the sealing faces is easily discharged from the outlet section 15b. Therefore, as shown by an arrow 17, a flow of the fluid is generated in a passage formed by the inlet section 15a, the pressure release groove 14, and the outlet section 15b, so that foreign substances and bubbles are prevented from remaining inside the passage.

An inner peripheral side part 15c of the outlet section 15b of the radial groove 15 that communicates with the negative pressure generation groove 13 is formed by extending the inclined outlet section 15b directly to the inner peripheral side. Thus, in the inner peripheral side part 15c that communicates with the negative pressure generation groove 13, as shown by an arrow 18, the flow of the fluid is also generated, so that foreign substances and bubbles are prevented from remaining in the inner peripheral side part 15c.

In the example of FIG. 2, a Rayleigh step mechanism 10' serving as a positive pressure generation mechanism is also provided between the outlet section 15b on the upstream side and the adjacent inlet section 15a on the downstream side. The reversed Rayleigh step mechanism serving as the negative pressure generation mechanism 12 is extended over the adjacent outlet sections 15b.

Therefore, positive pressure is generated substantially continuously on the outer peripheral side in the circumferential direction of the sealing faces S, and negative pressure is generated substantially continuously on the inner peripheral side. Thus, lubrication and leakage prevention can be further realized at the same time.

As described above, with the configuration of the first embodiment, the inlet section 15a and the outlet section 15b of the radial groove 15 are inclined in the directions in which the sections respectively open from the low pressure side toward the high pressure side, and the intersection angle θ of both the sections made by the tangent line m on the sealing face end is set to be an obtuse angle. Thereby, the fluid is easily taken into the inlet section 15a from the high pressure fluid side and the fluid on the sealing faces is easily discharged from the outlet section 15b. Therefore, as shown by the arrow 17, the flow of the fluid is generated in the passage formed by the inlet section 15a, the pressure release groove 14, and the outlet section 15b, so that foreign substances and bubbles are prevented from remaining inside the passage.

The inner peripheral side part 15c of the outlet section 15b of the radial groove 15 that communicates with the negative pressure generation groove 13 is formed by extending the inclined outlet section 15b directly to the inner peripheral side. Thus, in the inner peripheral side part 15c that communicates with the negative pressure generation groove 13, as shown by the arrow 18, the flow of the fluid is also generated, so that foreign substances and bubbles are prevented from remaining in the inner peripheral side part 15c.

Further, the Rayleigh step mechanism serving as the positive pressure generation mechanism 10 is also provided between the outlet section 15b on the upstream side and the adjacent inlet section 15a on the downstream side. The reversed Rayleigh step mechanism serving as the negative pressure generation mechanism 12 is extended over the adjacent outlet sections 15b. Therefore, positive pressure is generated substantially continuously on the outer peripheral side in the circumferential direction of the sealing faces S, and negative pressure is generated substantially continuously on the inner peripheral side. Thus, lubrication and leakage prevention can be further realized at the same time.

With reference to FIG. 3, the positive pressure generation mechanism formed by the Rayleigh step mechanism or the like and the negative pressure generation mechanism formed by the reversed Rayleigh step mechanism or the like will be described.

In FIG. 3(a), the rotating ring 3 and the stationary ring 5 serving as the opposing sliding parts relatively slide on each other as shown by arrows. For example, a Rayleigh step 11a is formed on the sealing face of the stationary ring 5 so as to be perpendicular to the relative movement direction and facing the upstream side, and a groove section 11 serving as the positive pressure generation groove is formed on the upstream side of the Rayleigh step 11a. The opposing sealing faces of the rotating ring 3 and the stationary ring 5 are flat.

When the rotating ring 3 and the stationary ring 5 are relatively moved in the directions shown by the arrows, the fluid placed between the sealing faces of the rotating ring 3 and the stationary ring 5 follows and moves in the movement direction of the rotating ring 3 or the stationary ring 5 due to the viscous property thereof. Thus, at that time, positive pressure (dynamic pressure) as shown by broken lines is generated due to existence of the Rayleigh step 11a.

It should be noted that the reference signs 15a and 15b denote the inlet section and the outlet section of the radial groove 15, and the reference sign R denotes a land section that forms the seal face S.

In FIG. 3(b), the rotating ring 3 and the stationary ring 5 serving as the opposing sliding parts also relatively slide on each other as shown by arrows. However, a reversed Rayleigh step 13a is formed on the sealing faces of the rotating ring 3 and the stationary ring 5 so as to be perpendicular to the relative movement direction and facing the downstream side, and a groove section 13 serving as the negative pressure generation groove is formed on the downstream side of the reversed Rayleigh step 13a. The opposing sealing faces of the rotating ring 3 and the stationary ring 5 are flat.

When the rotating ring 3 and the stationary ring 5 are relatively moved in the directions shown by the arrows, the fluid placed between the sealing faces of the rotating ring 3 and the stationary ring 5 follows and moves in the movement direction of the rotating ring 3 or the stationary ring 5 due to the viscous property thereof. Thus, at that time, negative pressure (dynamic pressure) as shown by broken lines is generated due to existence of the reversed Rayleigh step 13a.

It should be noted that the reference signs 15a and 15b denote the inlet section and the outlet section of the radial groove 15, and the reference sign R denotes the land section that forms the seal face S.

Second Embodiment

Figure 4:
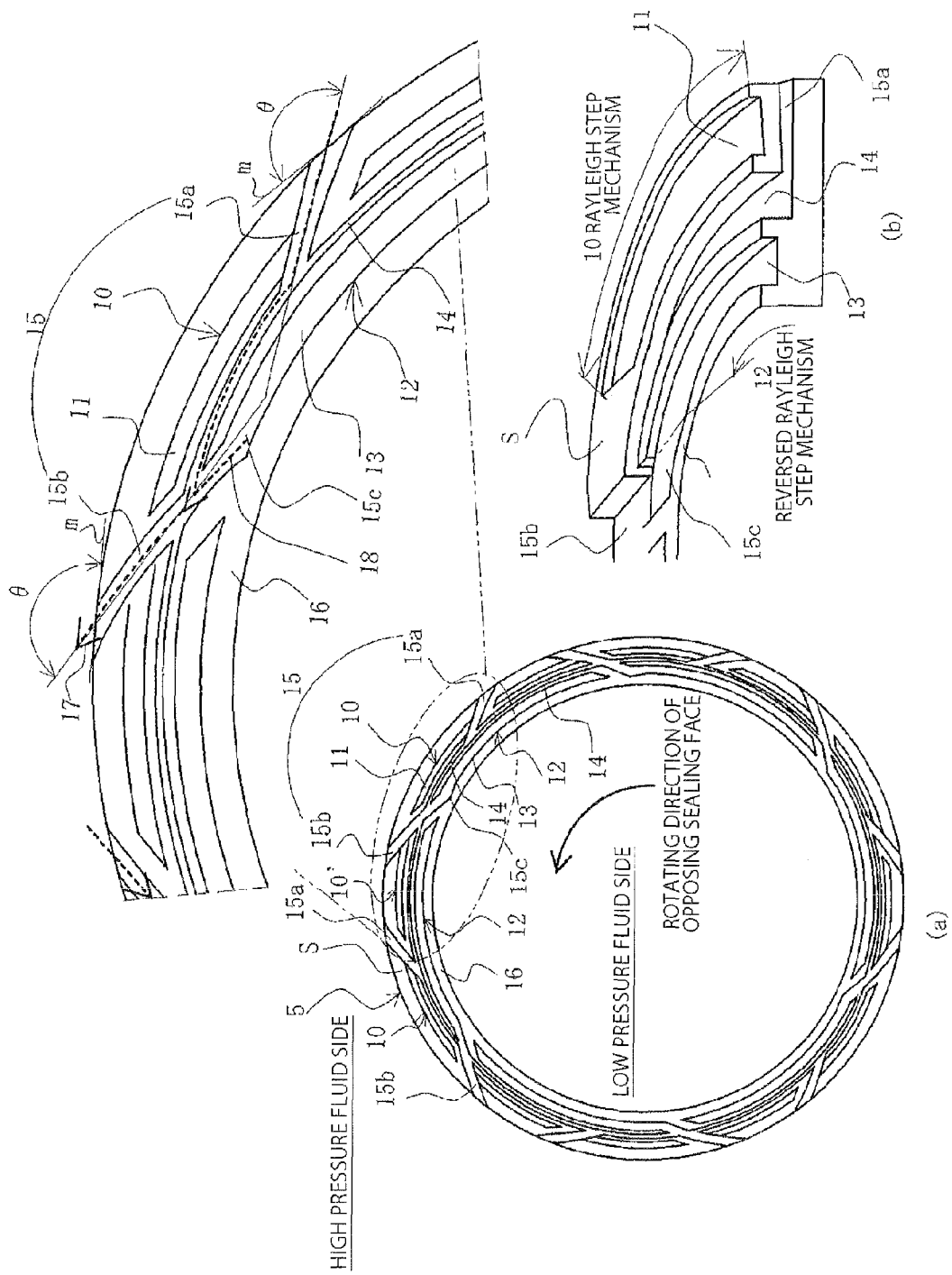
FIG. 4 shows a sealing face of a sliding part according to a second embodiment of the present invention.
Figure 5:
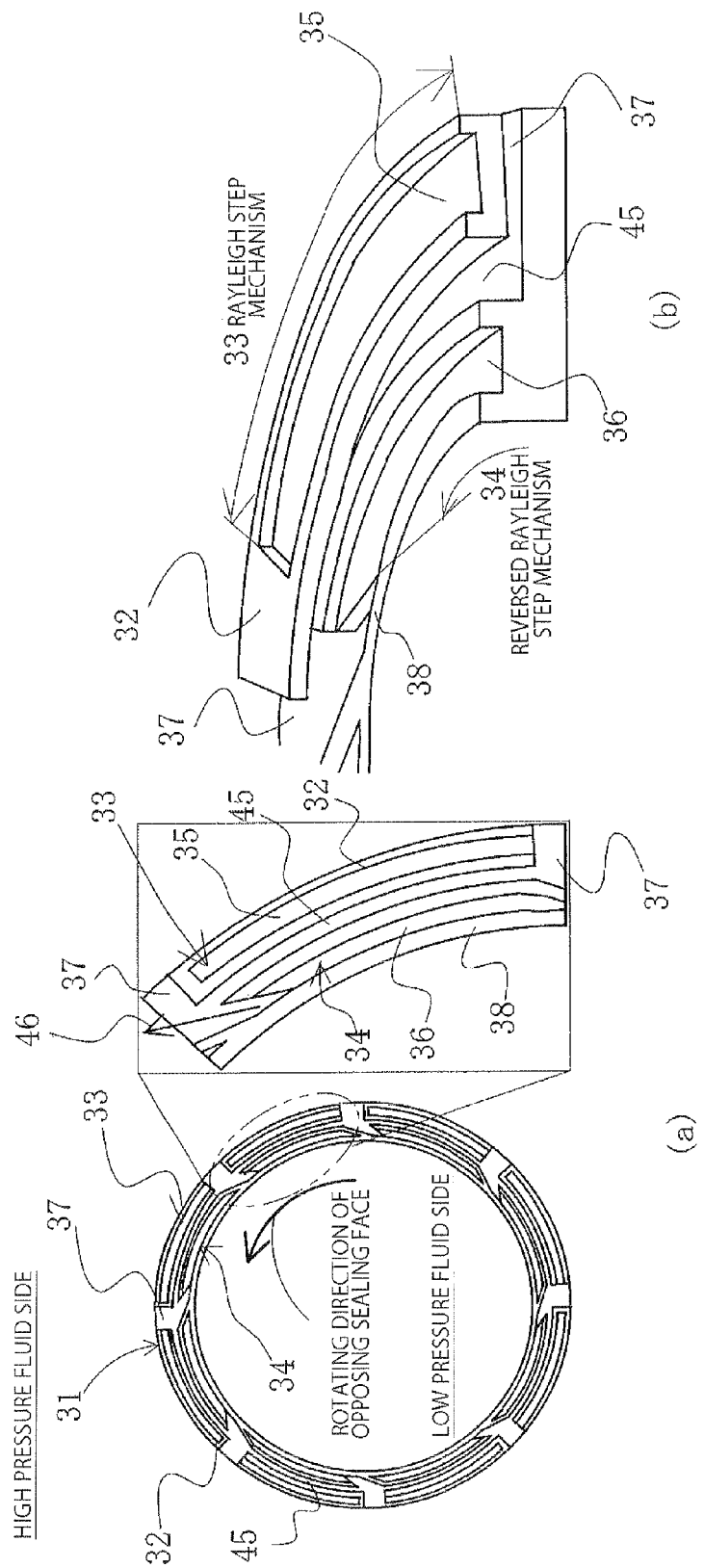
FIG. 5 is a view for illustrating the prior art.

With reference to FIG. 4, sliding parts according to a second embodiment of the present invention will be described.

It should be noted that the same members as the first embodiment will be given the same reference signs and duplicated description will be omitted.

In FIG. 4, the outlet section 15b of the radial groove 15 is formed in a spiral shape from the low pressure side (inner peripheral side in FIG. 4) to the high pressure side (outer peripheral side in FIG. 4) in order to lower the pressure on the low pressure side.

The part 15c of the outlet section 15b of the radial groove 15 that communicates with the negative pressure generation groove is formed to be equal to or deeper than the positive pressure generation groove 11 or the negative pressure generation groove 13 and shallower than the other parts of the radial groove 15. Preferably, the depth of the part 15c that communicates with the negative pressure generation groove is formed to be one to five times greater than the depth of the positive pressure generation groove 11 or the negative pressure generation groove 13.

As one example, it is thought that the depth of the positive pressure generation groove 11 or the negative pressure generation groove 13 is 2 µm and the depth of the outlet section 15b of the radial groove 15 is 100 µm while the depth of the part 15c that communicates with the negative pressure generation groove is about 2 to 10 µm.

In a case of FIG. 4, the depth of the part 15c that communicates with the negative pressure generation groove is formed to be the same as the depth of the negative pressure generation groove 13.

The depth of the part 15c of the outlet section 15b of the radial groove 15 that communicates with the negative pressure generation groove is formed to be one to five times greater than the depth of the negative pressure generation groove 13. Thus, the part 15c that communicates with the negative pressure generation groove functions as the negative pressure generation mechanism, so that the inside pressure of the part 15c that communicates with the negative pressure generation groove can be maintained to be low. As a result, together with the fact that the outlet section 15b is formed in a spiral shape from the low pressure side to the high pressure side, the sealable limit pressure can be furthermore increased more than the sliding parts according to the prior art, so that a seal pressure resistance performance can be improved.

The embodiments of the present invention are described above with the drawings. However, specific configurations are not limited to these embodiments but modifications and additions that are made within the range not departing from the gist of the present invention are also included in the present invention.

For example, although the example that the sliding parts are used for any of a pair of rotating and stationary sealing rings in a mechanical seal device is described in the above embodiments, the sliding parts can also be utilized as sliding parts of a bearing that slides on a rotating shaft while sealing lubricating oil on one side in the axial direction of a cylindrical sealing face.

In addition, for example, although the case where the high-pressure sealed fluid exists on the outer peripheral side is described in the above embodiments, the present invention can also be applied to a case where the high-pressure fluid exists on the inner peripheral side.

In addition, for example, although the case where the positive pressure generation mechanism, the negative pressure generation mechanism, the pressure release groove, and the radial groove are provided in the stationary ring of the mechanical seal that forms the sliding parts is described in the above embodiments, the mechanisms and the grooves may be reversely provided in the rotating ring.

In addition, for example, the positive pressure generation mechanism may be provided in one of sealing rings, the negative pressure generation mechanism may be provided in the other sealing ring, and the pressure release groove and the radial groove may be provided in any of the sealing rings.

In addition, for example, although the example that six inlet sections and six outlet sections of the radial grooves are provided in the parts surrounded by the radial grooves and the pressure release grooves, so that six Rayleigh steps serving as the positive pressure generation mechanisms are provided and six reversed Rayleigh steps serving as the negative pressure generation mechanisms are provided is described in the above embodiments, the present invention is not limited to this. The number of the steps may be less than this such as four or more than this such as eight, twelve, or the like.

In addition, for example, although the case where the positive pressure generation mechanism is formed from the Rayleigh step mechanism is described in the above embodiments, the present invention is not limited to this. For example, the positive pressure generation mechanism may be formed by a spiral groove or a dimple, that is, any mechanism that generates positive pressure. In addition, similarly, although the case where the negative pressure generation mechanism is formed from the reversed Rayleigh step is described, the present invention is not limited to this. For example, the negative pressure generation mechanism may be formed by a reversed spiral groove.

REFERENCE SIGNS LIST

1 Rotating shaft
2 Sleeve
3 Rotating ring
4 Housing
5 Stationary ring
6 Coiled wave spring
7 Bellows
10 Positive pressure generation mechanism
11 Positive pressure generation groove
12 Negative pressure generation mechanism
13 Negative pressure generation groove
14 Pressure release groove
15 Radial groove
15a Inlet section of radial groove
15b Outlet section of radial groove
15c Part that communicates with negative pressure generation groove
16 Low pressure side seal face
S Seal face
R Land section
θ Intersection angle of inlet section and outlet section made by a tangent line on a sealing face end
m Tangent line"

The invention claimed is:

1. A pair of sliding parts comprising annular bodies, in which
a positive pressure generation mechanism including a positive pressure generation groove is provided on a high pressure side of one of sealing faces that relatively slide on each other,
a negative pressure generation mechanism including a negative pressure generation groove is provided on a low pressure side,
a pressure release groove is provided between the positive pressure generation groove and the negative pressure generation groove, and further, a radial groove that provides communication between the positive pressure generation groove, the pressure release groove and the negative pressure generation groove, and a high pressure fluid side is provided on the sealing face, and the positive pressure generation groove, the pressure release groove, the negative pressure generation groove, and the radial groove are isolated from a low pressure fluid side by a seal face,
wherein:
the radial groove includes an inlet section that provides communication between an upstream side of the positive pressure generation groove and the pressure release groove, and the high pressure fluid side, and an outlet section that provides communication between a downstream side of the negative pressure generation groove and the pressure release groove, and the high pressure fluid side;
the inlet section and the outlet section are inclined in the directions in which the sections respectively open from the low pressure side toward the high pressure side; and
an intersection angle of both the sections made by a tangent line on a sealing face end is set to be an obtuse angle.

2. The sliding parts according to claim 1, wherein:
the positive pressure generation mechanism on the high pressure side is formed from a Rayleigh step mechanism;
the negative pressure generation mechanism on the low pressure side is formed from a reversed Rayleigh step mechanism;
the pressure release groove is formed from a circumferential groove;
plural pairs of the Rayleigh step mechanisms and the reversed Rayleigh step mechanisms are provided in such a manner that each of the pairs is set in parallel in the circumferential direction across the pressure release groove;
the Rayleigh step is also provided between the outlet section on the upstream side and the adjacent inlet section on the downstream side; and
the reversed Rayleigh step mechanism is extended over the adjacent outlet sections.

3. The sliding parts according to claim 1, wherein:
the outlet section is formed in a spiral shape from the low pressure side to the high pressure side.

4. The sliding parts according to claim 3, wherein:
a part of the outlet section that communicates with the negative pressure generation groove is formed to be equal to or deeper than the positive pressure generation groove or the negative pressure generation groove and shallower than the other parts of the radial groove.

5. The sliding parts according to claim 4, wherein:
the positive pressure generation mechanism on the high pressure side is formed from a Rayleigh step mechanism;
the negative pressure generation mechanism on the low pressure side is formed from a reversed Rayleigh step mechanism;
the pressure release groove is formed from a circumferential groove;
plural pairs of the Rayleigh step mechanisms and the reversed Rayleigh step mechanisms are provided in such a manner that each of the pairs is set in parallel in the circumferential direction across the pressure release groove;
the Rayleigh step is also provided between the outlet section on the upstream side and the adjacent inlet section on the downstream side; and
the reversed Rayleigh step mechanism is extended over the adjacent outlet sections.

6. The sliding parts according to claim 3, wherein:
the positive pressure generation mechanism on the high pressure side is formed from a Rayleigh step mechanism;
the negative pressure generation mechanism on the low pressure side is formed from a reversed Rayleigh step mechanism;
the pressure release groove is formed from a circumferential groove;
plural pairs of the Rayleigh step mechanisms and the reversed Rayleigh step mechanisms are provided in such a manner that each of the pairs is set in parallel in the circumferential direction across the pressure release groove;
the Rayleigh step is also provided between the outlet section on the upstream side and the adjacent inlet section on the downstream side; and
the reversed Rayleigh step mechanism is extended over the adjacent outlet sections.

7. The sliding parts according to claim 6, wherein:
the positive pressure generation mechanism on the high pressure side is formed from a Rayleigh step mechanism;
the negative pressure generation mechanism on the low pressure side is formed from a reversed Rayleigh step mechanism;
the pressure release groove is formed from a circumferential groove;
plural pairs of the Rayleigh step mechanisms and the reversed Rayleigh step mechanisms are provided in such a manner that each of the pairs is set in parallel in the circumferential direction across the pressure release groove;
the Rayleigh step is also provided between the outlet section on the upstream side and the adjacent inlet section on the downstream side; and
the reversed Rayleigh step mechanism is extended over the adjacent outlet sections.

8. The sliding parts according to claim 1, wherein:
a part of the outlet section that communicates with the negative pressure generation groove is formed to be equal to or deeper than the positive pressure generation groove or the negative pressure generation groove and shallower than the other parts of the radial groove.

9. The sliding parts according to claim 8, wherein:
the positive pressure generation mechanism on the high pressure side is formed from a Rayleigh step mechanism;
the negative pressure generation mechanism on the low pressure side is formed from a reversed Rayleigh step mechanism;
the pressure release groove is formed from a circumferential groove;
plural pairs of the Rayleigh step mechanisms and the reversed Rayleigh step mechanisms are provided in such a manner that each of the pairs is set in parallel in the circumferential direction across the pressure release groove;
the Rayleigh step is also provided between the outlet section on the upstream side and the adjacent inlet section on the downstream side; and
the reversed Rayleigh step mechanism is extended over the adjacent outlet sections.

\* \* \* \* \*